United States Patent
Torii et al.

Patent Number: 5,595,716
Date of Patent: Jan. 21, 1997

[54] SYNTHETIC MIXED-LAYER SILICATE AND METHOD FOR THE PREPARATION THEREOF

[75] Inventors: Kazuo Torii, Sendai; Takashi Iwasaki, Tagajo; Yoshio Onodera, Sendai, all of Japan

[73] Assignee: Japan as directed by Director General of Agency of Industrial Science and Technology, Tokyo-to, Japan

[21] Appl. No.: 516,533

[22] Filed: Aug. 18, 1995

[30] Foreign Application Priority Data

Aug. 23, 1994 [JP] Japan .................... 6-222673

[51] Int. Cl.$^6$ ............................ C01B 33/40
[52] U.S. Cl. .................... 423/328.2; 423/330.1; 423/331; 423/333
[58] Field of Search ................ 423/328.2, 330.1, 423/331, 333

[56] References Cited

U.S. PATENT DOCUMENTS

| | | | |
|---|---|---|---|
| 3,671,190 | 6/1972 | Neumann | 423/331 |
| 3,844,979 | 10/1974 | Hickson | 423/328.2 |
| 3,855,147 | 12/1974 | Granquist | 252/315.5 |
| 4,040,974 | 8/1977 | Wright et al. | 423/333 |
| 4,749,676 | 6/1988 | Blumenthal et al. | 423/331 |
| 5,089,458 | 2/1992 | Breukelaar et al. | 502/63 |

FOREIGN PATENT DOCUMENTS

3934473A1  4/1991  Germany.

OTHER PUBLICATIONS

*Database WPI*, Week 8348, Derwent Publications Ltd., AN 83-830471 (abstract of Jp-A-58-181718) (1983) Oct.

Primary Examiner—Mark L. Bell
Assistant Examiner—David Sample
Attorney, Agent, or Firm—Wenderoth, Lind & Ponack

[57] ABSTRACT

A novel synthetic mixed-layer silicate consisting of the layers of serpentine and layers of saponite each having a specified chemical composition is proposed, which has excellent dispersibility in water to form a colloidal dispersion capable of being converted into a gel by standing to be useful as a gelating agent exhibiting thixotropy along with unique porosity characteristics which enable the use thereof as an adsorbent. The mixed-layer silicate is prepared by the process comprising the steps of: (a) preparing an acidic aqueous solution containing silicic acid, magnesium salt and aluminum salt; (b) alkalifying the solution by the addition of an alkaline compound to precipitate a hydrous composite oxide containing silicon, magnesium and aluminum; (c) collecting the precipitates of the hydrous composite oxide; (d) admixing the precipitates of the hydrous composite oxide with an aqueous solution of an alkali metal hydroxide to give an aqueous slurry; and (e) subjecting the aqueous slurry of the hydrous composite oxide to a hydrothermal treatment by heating at a temperature up to 500° C.

14 Claims, No Drawings

SYNTHETIC MIXED-LAYER SILICATE AND METHOD FOR THE PREPARATION THEREOF

BACKGROUND OF THE INVENTION

The present invention relates to a synthetic mixed-layer silicate or, more particularly, to a synthetic mixed-layer silicate having serpentine and smectite as the component layers as well as a method for the preparation thereof. To say further, the invention relates to a synthetic mixed-layer silicate capable of being dispersed in water to form a gel and capable of giving a porous material by dehydration of the aqueous gel as well as a method for the preparation thereof by a process including a hydrothermal treatment.

Occurrence in nature is well known of various kinds of mixed-layer minerals including those consisting of mica and smectite as an example. See, for example, Crystal Structure of Clay Minerals and their X-Ray Identification, edited by G. W. Brindley, et al., Mineralogical Society, London, pages 249–303 (1980). They are scarcely used as industrial materials because of their rare occurrence in nature so that almost no attention has been paid to the practical application of such mixed-layer minerals excepting for a small amount of raw materials of pottery. Nevertheless, most of mixed-layer minerals belong to the class of very unique materials having an interstratified structure consisting of a combination of non-swellable layers and swellable layers possibly to exhibit characteristics of both of these constituents so that it is eagerly desired to develop a novel functional material by controlling the interstratified structure thereof.

For example, so-called 1:1 clay minerals can be classified into two major groups including, one, kaolinite which is a dioctahedral clay mineral having aluminum atoms in the octahedral sheet and, the other, serpentine which is a trioctahedral clay mineral having magnesium atoms occupying the octahedral cation sites. Known mixed-layer minerals consisting of layers of a 1:1 clay mineral as the non-swellable layers and smectite layers as the swellable layers include those consisting of kaolinite and smectite. See, for example, X-Ray Diffraction and the Identification and Analysis of Clay Minerals, D. M. Moore, et al., Oxford University Press, pages 259–263 (1989). While a mixed-layer mineral consisting of serpentine and smectite is supposedly a possibility of mixed-layer minerals, no report is found of a mixed-layer silicate of this type.

Serpentine occurs in nature as a main constituent mineral of serpentinite formed by the metamorphic transformation of olivine and is classified into three types including chrysotile having a fibrous morphology, lizardite having a morphology of platelets and antigorite having a morphology of platelet accompanied by a wavy superstructure in the direction of the x-axis. Aluminum lizardite and amesite are each a mineral formed by isomorphous substitution by aluminum atoms in the tetrahedral sheet and octahedral sheet of serpentine and have a morphology of platelet.

Serpentine has a typical chemical composition expressed by the general formula

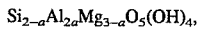

$Si_{2-a}Al_{2a}Mg_{3-a}O_5(OH)_4$, in which the subscript a is 0 or a positive number not exceeding 1. Serpentine minerals are classified by the value of this subscript a including lizardite having a value of a equal to or close to 0, amesite having a value of a equal to 1 and aluminum lizardite having a values of a intermediate between 0 and 1.

Aluminum lizardite can be synthesized by the hydrothermal reaction as is reported in Am. Miner., volume 44, pages 143–152 (1959). Serpentine minerals inherently do not exhibit layer charges so that they have no cation-exchangeable capacity. They are usually not dispersible in water so that sol or gel can never be formed therefrom. Among the serpentine minerals having a fibrous morphology, chrysotile is used in various applications as asbestos. Almost no industrial applications have been developed, however, for the serpentine minerals of other types.

On the other hand, smectite is a clay mineral consisting of very fine particles and smectite minerals in general have unique properties such as ion-exchangeability exhibited by the layer charges, swellability in water, dispersibility, intercalation and the like so that, different from other clay minerals such as kaolinite which is used as a raw material in pottery, they are used in various special industrial applications such as drilling mud, foundry sand, starting material in the preparation of organophillic smectites as an additive in paints, printing inks and greases, and so on.

Smectites are grossly classified into the dioctahedral smectites and trioctahedral smectites having, in many cases, trivalent aluminum atoms and divalent magnesium atoms, respectively, as the octahedral cations. Substitutions by cations of lesser charges, notably $Si^{4+}$ by $Al^{3+}$ in tetrahedral sheets and $Al^{3+}$ by $Mg^{2+}$ in octahedral sheets, produce resultant negative layer charges on the layers which are balanced by interlayer exchangeable cations. The minerals belonging to the dioctahedral smectite include montmorillonite, beidellite and the like while the minerals belonging to the trioctahedral smectite include saponite, hectorite, stevensite and the like.

The saponite has a chemical composition expressed by the general formula

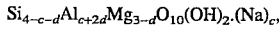

$Si_{4-c-d}Al_{c+2d}Mg_{3-d}O_{10}(OH)_2 \cdot (Na)_c$, and the layer charges are determined by the value of the subscript c obtained by subtraction of the amount of aluminum substituting octahedral Mg from the amount of aluminum substituting tetrahedral Si. A method is disclosed in Japanese Patent Kokai 58-181718 for the synthetic preparation of a saponite by the hydrothermal method at a temperature not exceeding 350° C.

On the other hand, U.S. Pat. No. 3,855,147 discloses a synthetic smectite composition having a structure in which an accessory phase selected from the group consisting of magnesium oxide, magnesium hydroxide and hydrous magnesium oxide exists in the saponite-like crystal lattice. It is, however, rather likely that an artificial mineral is close to that of a chlorite-like clay mineral if the saponite-like mineral has the structure containing magnesium hydroxide or hydrous magnesium oxide within interlayers. The above mentioned U.S. patent contains an example for a synthetic smectite composition in which a single accessory phase is formed from magnesium oxide alone. At any rate, absolutely no suggestive disclosures are found in the prior art for the mixed-layer silicate consisting of serpentine and smectite as is the subject matter of the present invention.

In view of the above described situations relative to synthetic mixed-layer minerals, the inventors have conducted extensive investigations for the development of novel mixed-layer minerals or, in particular, silicates having usefulness in an industrial application arriving at the completion of the present invention.

SUMMARY OF THE INVENTION

The present invention accordingly has an object to provide a novel synthetic mixed-layer mineral or, in particular, silicate having industrial usefulness as well as a method for the preparation thereof.

Thus, the mixed-layer mineral provided by the present invention is a mixed-layer silicate consisting of the layers of serpentine and layers of smectite or, in particular, saponite, the serpentine having a chemical composition expressed by the general formula $$Si_{2-a}Al_{2a}Mg_{3-a}O_5(OH)_{4-b}F_b, \quad (I)$$

in which the subscript a is 0 or a positive number not exceeding 1 and the subscript b is 0 or a positive number not exceeding 4, and the saponite having a chemical composition expressed by the general formula $$[Si_{4-c-d}Al_{c+2d}Mg_{3-d}O_{10}(OH)_{2-e}F_e]^{c-}.M^{f+}c/f, \quad (II)$$

in which the subscript c is a positive number smaller than 1, d is 0 or a positive number not exceeding 1, e is 0 or a positive number not exceeding 2, f is a positive number in the range from 1 to 2 and M is a cation or a combination of cations selected from the group consisting of the ions of alkali metals and alkaline earth metals and ammonium ion.

Assuming the number of the serpentine layers as x and the number of the saponite layers as y in the mixed-layer silicate, the ratio of x:y is in the range from 0.1 to 10.

In particular, the mixed-layer silicate of the invention according to the above given definition is further specified by the parameters A, B, C, D and E which correspond to the elemental values relative to the contents of silicon, aluminum, magnesium, sodium and fluorine, respectively. The values are given by the respective equations of: A=(2−a)x+(4−c−d)y; B=2ax+(c+2d)y; C=(3−a)x+(3−d)y; D=cy; and E=bx+ey, in such ranges of the proportion that B/A is a positive number smaller than 8/8, C/A is in the range from 6/8 to 12/8, D/A is a positive number smaller than 2/8, and E/A is 0 or a positive number smaller than 16/8.

The above defined synthetic mixed-layer silicate can be prepared by a method which comprises the steps (a) preparing an acidic aqueous solution containing silicic acid, a magnesium salt and an aluminum salt;

(b) alkalifying the acidic aqueous solution by the addition of a water-soluble alkaline compound to precipitate a hydrous composite oxide containing silicon, magnesium and aluminum;

(c) collecting the precipitates of the hydrous composite oxide by separating from the aqueous medium;

(d) admixing the precipitates of the hydrous composite oxide with an aqueous solution of an alkali metal hydroxide to give an aqueous slurry; and (e) subjecting the aqueous slurry of the hydrous composite oxide prepared in step (d) to a hydrothermal treatment by heating at a temperature in the range from 100° C. to 500° C.

DETAILED DESCRIPTION OF THE PREFERRED EMBODIMENTS

Since a mixed-layer mineral has a structure consisting of different kinds of component layers, a specific difficult problem must be taken into consideration in understanding the crystallographic structure thereof. Assuming that a mixed-layer mineral consists of two different kinds of component layers P and Q, it would be an interesting subject matter what relationship is held in the tetrahedral sheet compositions or octahedral sheet compositions of the layers P and layers Q. This problem, however, cannot be solved by the currently available analytical methods which cannot give information on each of the layers but can provide only the information on the analytical values for the mixed-layer structure as a whole. Nevertheless, data have been accumulated for the compositions relative to each type of the layers P and layers Q taken alone along with the knowledge on the relative proportion of the amounts of the different kinds of layers in many cases. These prior art information is useful for the design of the composition in a novel mixed-layer mineral consisting of the layers P and layers Q.

This guide principle is also applicable to the composition design of the inventive mixed-layer silicate consisting of serpentine layers and smectite layers when adequate selection is made for the proportion of the respective layers by assuming the chemical compositions of the tetrahedral sheets or octahedral sheets of the serpentine layers and smectite layers. For example, the chemical composition relative to silicon, magnesium, aluminum and, optionally, fluorine in the inventive synthetic mixed-layer silicate can be designed by adequately assuming the values of the subscripts a, b, c, d, e and f in the above given general formulas (I) and (II) as well as the proportion of the numbers of the serpentine layers and saponite layers given by the ratio x:y.

The above defined mixed-layer silicate of the invention can be prepared by a process consisting of several steps described below. In the first step, a hydrous composite oxide of silicon, magnesium and aluminum is prepared, which is, in the second step, admixed with exchangeable cations and, according to need, fluorine ions to give an aqueous slurry of the hydrous composite oxide. In the third step, the aqueous slurry is subjected to a hydrothermal treatment so as to form a synthetic mixed-layer silicate by the hydrothermal reaction. In the fourth step, the thus obtained material by the hydrothermal reaction is dried and pulverized, according to need, to give the final product of the synthetic mixed-layer silicate in the form of a powder.

In the above mentioned first step, water-soluble compounds of silicon, magnesium and aluminum such as silicic acid, magnesium chloride and aluminum chloride, respectively, are dissolved in an aqueous medium in such a proportion to be in conformity with the chemical composition of the mixed-layer silicate as designed according to the general formulas (I) and (II) and the desired value of x:y to give an aqueous solution from which the hydrous composite oxide is precipitated and washed with water to be freed from the electrolyte impurities contained in the slurry.

Precipitation of the hydrous composite oxide of silicon, magnesium and aluminum can be performed by the addition of an aqueous solution of an alkali to the above prepared mixed acidic aqueous solution. Alternatively, the precipitates of hydrous composite oxide can be obtained by first mixing sodium silicate and an aqueous alkaline solution followed by the addition of acidic aqueous solutions of a magnesium salt and an aluminum salt either separately or as a mixed solution prepared separately. Further alternatively, an aqueous alkaline solution of sodium silicate and sodium aluminate is prepared with admixture of an aqueous alkali solution followed by the addition of an aqueous solution of a magnesium salt and, according to need, an aqueous solution of an aluminum salt to precipitate a hydrous composite oxide.

The aqueous solution of silicic acid can be prepared by the admixture of an aqueous solution of sodium silicate with an inorganic acid to bring the pH of the solution into the acidic range. In order to prevent gelation of the solution, the pH of the silicic acid solution is controlled preferably within the range of 1 to 3 in the admixture of the inorganic acid with an aqueous solution of sodium silicate. Various grades of so-called water glass products available on the market as well as sodium metasilicate can be used as such as the silicic acid source. The inorganic acid is selected from nitric acid, hydrochloric acid and sulfuric acid though not particularly limitative thereto. The salts of magnesium and aluminum suitable for use include chlorides, sulfates, nitrates, carbonates, perchlorates and the like of the respective elements without particular limitations. The aqueous alkaline solution used for the pH control or alkalification of the acidic solution can be ammonia water or an aqueous solution of the hydroxide of an alkali metal such as sodium, potassium and lithium.

One of the important factors in the precipitation of the hydrous composite oxide of silicon, magnesium and aluminum by the addition of an aqueous alkaline solution to the acidic solution is the pH value of the solution after admixture of the alkaline solution. Namely, the pH should be in the range from 7 to 12 or, preferably, from 9 to 11. Magnesium and aluminum cannot be fully precipitated when the pH is too low while silicon remains in the solution as unprecipitated when the pH is too high.

In the mixing of the acidic solution of silicon, magnesium and aluminum, and the aqueous alkaline solution, the former solution can be introduced dropwise into the latter solution or vice versa under agitation, if necessary. It is of course optional and possible to introduce these two solutions concurrently into a vessel or into a pipe line so as to cause instantaneous mixing there to form an aqueous slurry. The precipitates thus formed are separated from the mother liquor by filtration and repeatedly washed with deionized water to be freed from any electrolytes contained in the aqueous slurry.

In the second step, the above obtained precipitates of the hydrous composite oxide are dispersed into an aqueous medium to give an aqueous slurry with admixture of an alkali hydroxide, fluoride or a combination thereof in the form of an aqueous solution. If it is desired, though not essential, to introduce fluorine ions into the final product of the mixed-layer silicate, it is convenient to admix the aqueous slurry with hydrofluoric acid. The amount of the exchangeable cations to be added to the aqueous slurry is given by the subscript c in the general formula (II) given above.

In the third step of the inventive method to follow, the above prepared aqueous slurry is subjected to a hydrothermal treatment. Thus, the aqueous slurry is introduced into an autoclave and heated at a temperature of 100° to 500° C. so as to form the desired mixed-layer silicate of the invention. The hydrothermal reaction proceeds under a pressure autogenously produced at the temperature and extra-pressurization has no particular advantageous effects. Agitation of the aqueous slurry during the hydrothermal treatment is not always necessary. The rate of the hydrothermal reaction is increased as the reaction temperature is increased and an increase in the reaction temperature has an effect to increase the crystallinity of the resultant product. The hydrothermal reaction is complete usually within 24 hours though dependent on the temperature and other factors.

In the fourth step of the inventive method, the aqueous slurry of the mixed-layer silicate is taken out of the autoclave and, if necessary, dried by heating at a temperature of 60° C. or higher. When caking of the dried product occurs, the cakes can be disintegrated by a suitable pulverization method into a powder. Spray drying can be undertaken conveniently to effect drying and disintegration of the product simultaneously.

The synthetic mixed-layer silicate prepared in the above described manner according to the inventive method can be characterized and evaluated by several physical and chemical methods including the X-ray diffractometry, differential thermal analysis, infrared absorption spectrophotometry, chemical analysis, measurement of the cation-exchangeable capacity, measurement of the rheological behavior of the aqueous dispersion thereof, measurement of the porosity parameters and so on.

For example, the synthetic mixed-layer silicate of the invention has a cation-exchangeable capacity of up to 130 meq./g depending on the proportion of the serpentine and smectite constituents. The mixed-layer silicate of the invention, of which the proportion of the serpentine constituent to the smectite constituent x:y is 4 or smaller exhibits good dispersibility in water to give a colloidal aqueous dispersion which exhibits good gelation behavior with thixotropy so that it is very useful as an additive to a water-base paint and cosmetic and toiletry composition and as a raw material of ceramics, slurry stabilizer, sedimentation-preventing agent, thickening agent, binder, suspension stabilizer, thixotropy-imparting agent and so on. As a particularly unique application of the product, the mixed-layer silicate of the invention can be used as an additive in the drilling mud used in the boring works for deep geothermal power generation or oil well excavation. Further, a porous material having mesopores of 2 to 7 nm pore diameter can be prepared by dehydrating the inventive mixed-layer silicate by heating, which is useful as a solid catalyst or catalyst support for chemical reactions, adsorbent, gas-separating agent and so on. Having a platelet-like morphology and layer structure of the particles, the inventive mixed-layer silicate can be used as a filler in a polymeric material or an additive in a polymer-based composite material.

In the following, the synthetic mixed-layer silicate of the invention and the method for the preparation thereof are described in more detail by way of examples.

EXAMPLE 1

Into a beaker of 1000 ml capacity were taken 400 ml of water and 68.7 g of water glass containing 28% by weight of $SiO_2$ and 9% by weight of $Na_2O$ to form an aqueous solution into which 18 ml of a 16N nitric acid were added dropwise under agitation. The thus obtained silicic acid solution was admixed with 71.1 g of reagent-grade magnesium chloride hexahydrate having a purity of 98% and 5.66 g of aluminum chloride hexahydrate having a purity of 98% to prepare a uniform silicic acid-magnesium-aluminum aqueous solution, which was introduced dropwise into 420 ml of a 2N aqueous solution of sodium hydroxide under agitation over a period of 5 minutes so that precipitates were formed to give an aqueous suspension having a pH of 10.2. The thus formed precipitates of the hydrous composite oxide were immediately separated from the mother liquor by filtration and, after thorough washing with water, added in 21 ml of a 1N aqueous solution of sodium hydroxide to prepare an aqueous slurry having a pH of 11.6, which was transferred into an autoclave and heated at 300° C. for 2 hours under an autogenous pressure. The aqueous slurry after the hydrothermal treatment having a pH of 10.4 taken out of the autoclave was dried at 80° C. and the dried material was disintegrated into a powder, which is referred to as MLS (mixed-layer silicate) I hereinafter.

The above given formulation of the starting materials corresponded to the values of a=0, b=0, c=0.4, d=0, e=0, f=1, x=1 and y=1 in the formulas (I) and (II) while the chemical composition of the product as determined by chemical analysis corresponded to the values of A=8.0, B=0.55, C=8.43, D=0.56 and E=0 assuming that:

$A=(2-a)x+(4-c-d)y;$ $B=2ax+(c+2d)y;$ $C=(3-a)x+(3-d)y;$ $D=cy;$ and $E=bx+ey.$

The product had a capacity for cation exchange of 0.70 meq./g. The X-ray diffraction pattern of the oriented sample had two broad peaks corresponding to the d-spacings of 2.13 nm and 1.10 nm assumably corresponding to the (001) and (002) peaks, respectively. The d value of the (35, 06) reflection peak obtained from the powder X-ray diffraction pattern was 0.1535 nm. An aqueous dispersion of the product powder in a concentration of 2.5% by weight was converted by standing for 24 hours into a transparent solid gel exhibiting thixotropy.

EXAMPLE 2

A hydrous composite oxide was prepared in substantially the same manner as in Example 1 by using:

68.7 g of the same water glass;

79.3 g of magnesium chloride hexahydrate;

13.1 g of aluminum chloride hexahydrate;

18 ml of 16N nitric acid; and 530 ml of 2N aqueous solution of sodium hydroxide.
The pH of the precipitates slurry was 10.5.

The thus prepared hydrous composite oxide was added in 18 ml of a 1N aqueous solution of sodium hydroxide to give an aqueous slurry having a pH of 11.5, which was transferred into an autoclave and subjected to a hydrothermal treatment at 300° C. for 24 hours. The aqueous slurry after the hydrothermal treatment having a pH of 10.1 taken out of the autoclave was dried at 80° C. and the dried material was disintegrated into a powder product, referred to as the MLS II hereinafter.

The above given formulation of the starting materials corresponded to the values of a=0.2, b=0, c=0.4, d=0, e=0, f=1, x=2 and y=1 in the formulas (I) and (II) while the chemical composition of the product as determined by chemical analysis corresponded to the values of A=8.0, B=1.29, C=9.08, D=0.45 and E=0.

The product had a cation-exchangeable capacity of 0.54 meq./g and the exchangeable cation was sodium ion. The X-ray diffraction pattern of the oriented sample had three broad peaks corresponding to the d-spacings of 3.06 nm, 1.08 nm and 0.750 nm assumably corresponding to the (001), (003) and (004) peaks, respectively. The d value of the (35, 06) reflection peak obtained from the powder X-ray diffraction pattern was 0.1537 nm. An aqueous dispersion of the product powder in a concentration of 2.5% by weight was converted by standing for 24 hours into a transparent solid gel exhibiting thixotropy.

EXAMPLE 3

A hydrous composite oxide was prepared in substantially the same manner as in Example 1 by using:

68.7 g of the same water glass;

62.2 g of magnesium chloride hexahydrate;

10.0 g of aluminum chloride hexahydrate;

18 ml of 16N nitric acid; and 400 ml of 2N aqueous solution of sodium hydroxide.
The pH of the precipitates slurry was 10.5.

The thus prepared hydrous composite oxide was added in 31 ml of a 1N aqueous solution of sodium hydroxide to give an aqueous slurry having a pH of 12.0, which was transferred into an autoclave and subjected to a hydrothermal treatment at 300° C. for 24 hours. The aqueous slurry after the hydrothermal treatment having a pH of 9.4 taken out of the autoclave was dried at 80° C. and the dried material was disintegrated into a powder product, referred to as the MLS III hereinafter.

The above given formulation of the starting materials corresponded to the values of a=0.2, b=0, c=0.4, d=0, e=0, f=1, x=1 and y=3 in the formulas (I) and (II) while the chemical composition of the product as determined by chemical analysis corresponded to the values of A=8.0, B=0.91, C=7.64, D=0.82 and E=0.

The product had a cation-exchangeable capacity of 0.83 meq./g and had sodium ions as the exchangeable cations. The X-ray diffraction pattern of the oriented sample had two broad peaks corresponding to the d-spacings of 2.01 nm and 1.25 nm assumably corresponding to the (003) and (004) peaks, respectively. The d value of the (35, 06) reelection peak obtained from the powder X-ray diffraction pattern was 0.1534 nm. An aqueous dispersion of the product powder in a concentration of 2.5% by weight was converted by standing for 24 hours into a transparent solid gel exhibiting strong thixotropy.

EXAMPLE 4

Five aqueous dispersions each in a concentration of 2.5% by weight were prepared by dispersing either one of the three powder products prepared in Examples 1, 2 and 3 described above, i.e. MLSs I, II and III, and two grades of commercial bentonite products including, one, that of an ordinary grade, referred to as the bentonite I hereinafter, and, the other, that of a purified grade, referred to as the bentonite II hereinafter. Each of the aqueous dispersions was subjected to the measurement of the rheological properties at 25° C. by using a Fann VG Meter to give the results shown in Table 1 below. The same rheological measurements were undertaken for MLS II and bentonite I with aqueous dispersions in concentrations of 4.5% and 6.5% by weight to give the results also shown in Table 1.

TABLE 1

| | Dispersion concentration, % | Apparent viscosity, cp | | Plastic viscosity, cp | Yield value, lb/100 ft² | Gel strength, lb/100 ft² | |
|---|---|---|---|---|---|---|---|
| | | 10.2/s | 1022/s | | | 10 seconds | 10 minutes |
| MLS I | 2.5 | 575 | 12 | 4.5 | 14 | 23 | 43 |
| MLS II | 2.5 | 50 | 4 | 2.5 | 2.5 | 1 | 6 |
| | 4.5 | 325 | 9 | 4.5 | 8.5 | 10 | 21 |
| | 6.5 | 1200 | 19 | 6.5 | 24 | 31 | 52 |
| MLS III | 2.5 | 400 | 11 | 5 | 11 | 8 | 26 |
| Bentonite I | 2.5 | 25 | 2.5 | 2 | 1 | 1 | 1 |
| | 4.5 | 50 | 4.3 | 4 | 1 | 1 | 1 |
| | 6.5 | 50 | 8.3 | 7.5 | 1.5 | 1 | 1 |
| Bentonite II | 2.5 | 25 | 8 | 7 | 2 | 1 | 1 |

As is understood from Table 1, the aqueous dispersion of the mixed-layer silicates according to the invention or, in particular, MLS I and MLS III exhibited very unique rheological properties as compared with those of bentonites. For example, the aqueous dispersion of the inventive mixed-layer silicate exhibited very high values of the yield value, gel strength and apparent viscosity at low shear rate as compared with the aqueous dispersions of the bentonites.

On the other hand, the rheological behavior of the aqueous dispersion of MLS II was not so remarkably different from those of the bentonite dispersions when the dispersion concentration was 2.5% by weight. When the concentration of MLS II was increased to 4.5% or 6.5% by weight and comparison was made with the bentonite I at the same concentration, it is noticeable that, while the apparent viscosity at high shear rate and the plastic viscosity alone were increased by the increase of the concentration in the latter, the aqueous dispersion of the inventive mixed-layer silicate indicated remarkable increase in all of the rheological items as measured or, in particular, in the apparent viscosity at low shear rate, gel strength and yield value. These results suggest that the mixed-layer silicate of the present invention is useful as a gelating agent.

Further, dispersions of MLS II and the bentonite II in sea water were prepared in a dispersion concentration of 8% by weight and the dispersions were subjected to the measurement of the apparent viscosity at three different shear rates at 25° C. by using a digital rotating viscometer (Model DV-B, manufactured by Tokyo Keiki Co.) to give the results shown in Table 2. It is understood from Table 2 that the mixed-layer silicate of the invention gives a much higher apparent viscosity of a dispersion in sea water than bentonite suggesting that the inventive mixed-layer silicate is useful as a gelating agent even in sea-water systems.

TABLE 2

| Dispersion | concentration, % | Apparent viscosity, cp | | |
|---|---|---|---|---|
| | | 3.96/s | 7.92/s | 15.8/s |
| MLS II | 8 | 2100 | 1130 | 660 |
| Bentonite II | 8 | 25 | 9 | 5 |

In addition, similar measurements of the apparent viscosity were undertaken for dispersions of MLS I and bentonite II in a concentration of 8% by weight and of MLS II in a concentration of 3% by weight in a 1N aqueous solution of sodium hydroxide at five different shear rates to give the results shown in Table 3 below. As is understood from Table 3, MLS I gives a dispersion having a much higher apparent viscosity than bentonite II when the dispersion concentration is identical and the apparent viscosity of the 3% dispersion of MLS II is in about the same level as the 8% dispersion of MLS I indicating that MLS II is particularly useful as a gelating agent in an alkaline medium.

TABLE 3

| | Dispersion concentration, % | Apparent viscosity, cp | | | | |
|---|---|---|---|---|---|---|
| | | 3.96/s | 7.92/s | 15.8/s | 39.6/s | 79.2/s |
| MLS I | 8 | 650 | 320 | 159 | 69 | 39 |
| MLS II | 3 | 670 | 280 | 113 | 49 | 34 |
| Bentonite II | 8 | 33 | 15 | 9 | 6 | 4 |

Table 4 below gives the results of the viscosity measurement similar to Table 3 above but replacing the 1N aqueous solution of sodium hydroxide as the dispersion medium with a 1N aqueous solution of hydrochloric acid. The concentration of the dispersed phase was 10% by weight for MLS I and bentonite II and 8% by weight for MLS III. The results in Table 4 indicate that the gelating ability of MLS I is much higher than bentonite II when the dispersion concentration for each of them is 10% by weight and still higher gelating ability is exhibited by MLS III even in a lower concentration of 8% by weight in an acidic medium.

TABLE 4

| | Dispersion concentration, % | Apparent viscosity, cp | | | | |
|---|---|---|---|---|---|---|
| | | 3.96/s | 7.92/s | 15.8/s | 39.6/s | 79.2/s |
| MLS I | 10 | 129 | 96 | 50 | 23 | 14 |
| MLS II | 8 | 490 | 250 | 147 | 64 | 37 |
| Bentonite II | 10 | 40 | 19 | 12 | 8 | 6 |

EXAMPLE 5

A hydrous composite oxide was prepared in substantially the same manner as in Example 1 by using:

68.7 g of the same water glass;
65.8 g of magnesium chloride hexahydrate;
30.7 g of aluminum chloride hexahydrate;

18 ml of 16N nitric acid; and 520 ml of 2N aqueous solution of sodium hydroxide.

The pH of the precipitates slurry was 10.5.

The thus prepared hydrous composite oxide was added in 37 ml of a 1N aqueous solution of sodium hydroxide to give an aqueous slurry having a pH of 11.8, which was transferred into an autoclave and subjected to a hydrothermal treatment at 300° C. for 24 hours. The aqueous slurry after the hydrothermal treatment having a pH of 10.7 taken out of the autoclave was dried at 80° C. and the dried material was disintegrated into a powder product, referred to as the MLS V hereinafter.

The above given formulation of the starting materials corresponded to the values of a=0.3, b=0, c=0.6, d=0.4, e=0, f=1, x=1 and y=1 in the formulas (I) and (II) while the chemical composition of the product as determined by chemical analysis corresponded to the values of A=8.0, B=3.21, C=9.32, D=1.44 and E=0. The product had a cation-exchangeable capacity of 0.45 meq./g. An aqueous dispersion of the product powder in a concentration of 2.5% by weight was a transparent sol solution.

EXAMPLE 6

A hydrous composite oxide was prepared in the same manner as in Example 1 excepting replacement of 420 ml of the 2N aqueous solution of sodium hydroxide with 400 ml of a 28% ammonia water. The aqueous slurry of the thus formed precipitates had a pH of 10.7. The precipitated hydrous composite oxide was immediately separated from the medium by filtration and, after thorough washing with water, re-dispersed in 21 ml of a 1N aqueous solution of sodium hydroxide to give an aqueous slurry having a pH of 10.7, which was transferred into an autoclave and subjected to a hydrothermal treatment at 250° C. for 24 hours. After cooling, the aqueous slurry having a pH of 10.1 was taken out of the autoclave and dried at 80° C. followed by disintegration into a powder, referred to as MLS VI hereinafter.

The above given formulation of the starting materials corresponded to the values of a=0, b=0, c=0.4, d=0, e=0, f=1, x=1 and y=1 in the formulas (I) and (II) while the chemical composition of the product as determined by chemical analysis corresponded to the values of A=8.0, B=0.50, C=8.42, D=0.21 and E=0. The product had a cation-exchangeable capacity of 0.61 meq./g. An aqueous dispersion of the product powder in a concentration of 2% by weight was converted into a transparent solid gel exhibiting thixotropy. The rheological properties of an aqueous dispersion thereof in a concentration of 3.5% by weight were as follows at 25° C.: apparent viscosity 24 cp at 1022/s and 2000 cp at 5.1/s; plastic viscosity 8.5 cp; yield value 31 lb/100 ft$^2$; and gel strength 29 lb/100 ft$^2$ after 10 seconds and 67 lb/100 ft$^2$ after 10 minutes.

EXAMPLE 7

The hydrous composite oxide prepared in just the same manner as in Example 1 was added in a mixture of 21 ml of a 1N aqueous solution of sodium hydroxide and 52 ml of a 10% aqueous solution of hydrofluoric acid to give an aqueous slurry having a pH of 8.4, which was subjected to a hydrothermal treatment in an autoclave at 200° C. for 24 hours under an autogenous pressure. After cooling, the aqueous slurry having a pH of 8.7 was taken out of the autoclave and dried at 80° C. followed by disintegration into a powder, referred to as MLS VII hereinafter.

The above given formulation of the starting materials corresponded to the values of a=0, b=3, c=0.4, d=0, e=1.5, f=1, x=1 and y=1 in the formulas (I) and (II) while the chemical composition of the product as determined by chemical analysis corresponded to the values of A=8.0, B=0.54, C=8.48, D=0.51 and E=6.33. The product had a cation-exchangeable capacity of 0.75 meq./g. The rheological properties of an aqueous dispersion thereof in a concentration of 2.5% by weight were as follows at 25° C.: apparent viscosity 3.3 cp at 1022/s and 50 cp at 10.2/s; plastic viscosity 2.5 cp; yield value 1.5 lb/100 ft$^2$; and gel strength 1 lb/100 ft$^2$ after 10 seconds and 5 lb/100 ft$^2$ after 10 minutes.

EXAMPLE 8

A mixed-layer silicate was prepared in just the same manner as in Example 1 except that the hydrothermal treatment of the hydrous composite oxide was performed at 200° C. for 24 hours under an autogenous pressure. The powdery product here obtained is referred to as MLS VIII hereinafter.

The formulation of the starting materials corresponded to the values of a=0, b=0, c=0.4, d=0, e=0, f=1, x=1 and y=1 in the formulas (I) and (II) while the chemical composition of the product as determined by chemical analysis corresponded to the values of A=8.0, B=0.54, C=8.58, D=0.13 and E=0. The product had a cation-exchangeable capacity of 0.48 meq./g. The mixed-layer silicate was imparted with porosity by dehydration and had a specific surface area of 451 m$^2$/g.

EXAMPLE 9

Into a beaker of 1000 ml capacity were taken 160 ml of water together with 68.7 g of the same water glass as used in Example 1 and 1.9 g of sodium aluminate and 42 ml of a 28% ammonia water to make an aqueous alkaline silicate-aluminate solution and an aqueous solution prepared separately by dissolving 71.2 g of magnesium chloride hexahydrate in 200 ml of water was added thereinto dropwise over a period of 5 minutes to precipitate a hydrous composite oxide in the form of an aqueous slurry having a pH of 9.7, which was collected by filtration and thoroughly washed with water to remove the electrolytes contained in the aqueous medium. The thus formed precipitates of the hydrous composite oxide were added in 11 ml of a 1N aqueous solution of sodium hydroxide to prepare an aqueous slurry having a pH of 11.5, which was transferred into an autoclave and heated at 450° C. for 24 hours under an autogenous pressure. The aqueous slurry after the hydrothermal treatment having a pH of 10.3 was taken out of the autoclave and dried at 80° C. followed by disintegration into a powder, which is referred to as MLS IX hereinafter.

The formulation of the above described starting materials corresponded to the values of a=0, b=0, c=0.4, d=0, e=0, f=1, x=1 and y=1 in the formulas (I) and (II) while the chemical composition of the product as determined by chemical analysis corresponded to the values of A=8.0, B=0.27, C=8.02, D=0.25 and E=0. The product had a cation-exchangeable capacity of 0.64 meq./g and the specific surface area thereof was 202 m$^2$/g. An aqueous dispersion of the powder in a concentration of 2% by weight was converted into a transparent gel.

EXAMPLE 10

Into a beaker of 1000 ml capacity were taken 160 ml of water together with 68.7 g of the same water glass as used in Example 1 and 50 ml of a 28% ammonia water to make an aqueous alkaline silicate solution and an aqueous solution prepared separately by dissolving 71.2 g of magnesium chloride hexahydrate and 5.6 g of aluminum chloride hexahydrate in 100 ml of water was added thereinto dropwise over a period of 5 minutes to precipitate a hydrous composite oxide in the form of an aqueous suspension having a pH of 10.2, which was collected by filtration and thoroughly washed with water to remove the electrolytes contained in the aqueous medium. The thus formed precipitates of the hydrous composite oxide were added in 11 ml of a 1N aqueous solution of sodium hydroxide to prepare an aqueous slurry having a pH of 11.1, which was transferred into an autoclave and heated at 250° C. for 2 hours under an autogenous pressure. The aqueous slurry after the hydrothermal treatment having a pH of 10.2 was taken out of the autoclave and dried at 80° C. followed by disintegration into a powder, which is referred to as MLS X hereinafter.

The formulation of the above described starting materials corresponded to the values of a=0, b=0, c=0.4, d=0, e=0, f=1, x=1 and y=1. The product had a cation-exchangeable capacity of 0.49 meq./g and the specific surface area thereof was 370 $m^2$/g after a heat treatment at 300° C.

EXAMPLE 11

A hydrous composite oxide was prepared in substantially the same manner as in Example 1 by using:

68.7 g of the same water glass;
77.0 g of magnesium chloride hexahydrate;
82.0 g of aluminum chloride hexahydrate;
18 ml of 16N nitric acid; and
440 ml of 4N aqueous solution of sodium hydroxide.

The pH of the precipitates suspension was 10.5.

The thus prepared hydrous composite oxide was added in 51 ml of a 1N aqueous solution of sodium hydroxide to give an aqueous slurry having a pH of 11.7, which was transferred into an autoclave and subjected to a hydrothermal treatment at 300° C. for 24 hours. The aqueous slurry after the hydrothermal treatment having a pH of 7.5 taken out of the autoclave was dried at 80° C. and the dried material was disintegrated into a powder product, referred to as the MLS XI hereinafter.

The above given formulation of the starting materials corresponded to the values of a=0.75, b=0, c=0.6, d=0.9, e=0, f=1, x=1 and y=1 in the formulas (I) and (II) while the chemical composition of the product as determined by chemical analysis corresponded to the values of A=8.0, B=7.50, C=9.28, D=1.45 and E=0. The specific surface area of the product powder was 199 $m^2$/g after a heat treatment at 300° C.

EXAMPLE 12

The powdery products MLS VI to MLS XI prepared in Examples 6 to 11 were, after a dehydrating heat treatment at 300° C., subjected to the measurements of the porosity characteristics including the specific surface area, pore volume and average pore diameter by the method of nitrogen gas adsorption at −196° C. to give the results shown in Table 5 below. The data given in the table including the specific surface area of 199 to 451 $m^2$/g and pore volume of 0.232 to 0.523 ml/g indicate that the mixed-layer silicates of the present invention are in general useful as a porous material. In particular, the average pore diameter of the products is from 2.60 to 6.12 nm within the so-called mesopore region so that they are promising as an adsorbent not only for the conventional gas-separation process but also for the adsorption separation of organic materials having a relatively large molecular weight such as various biochemical materials as well as in the application as a catalyst or catalyst support.

TABLE 5

|  | Specific surface area, $m^2$/g | Pore volume, ml/g | Average pore diameter, nm |
| --- | --- | --- | --- |
| MLS VI | 354 | 0.255 | 2.88 |
| MLS VII | 283 | 0.248 | 3.51 |
| MLS VIII | 451 | 0.293 | 2.60 |
| MLS IX | 202 | 0.309 | 6.12 |
| MLS X | 370 | 0.523 | 5.66 |
| MLS XI | 199 | 0.232 | 4.67 |

What is claimed is:

1. A synthetic mixed-layer silicate comprising x layers in number of serpentine and y layers in number of saponite, in which the serpentine has a chemical composition expressed by the general formula $$Si_{2-a}Al_{2a}Mg_{3-a}O_5(OH)_{4-b}F_b,$$

in which the subscript a is 0 or a positive number not exceeding 1 and the subscript b is 0 or a positive number not exceeding 4, and the saponite has a chemical composition expressed by the general formula $$[Si_{4-c-d}Al_{c+2d}Mg_{3-d}O_{10}(OH)_{2-e}F_e]^{c-}.M^{f+}c/f,$$

in which the subscript c is a positive number smaller than 1, the subscript d is 0 or a positive number not exceeding 1, the subscript e is 0 or a positive number not exceeding 2, the subscript f is a positive number in the range from 1 to 2 and M is a cation or a combination of cations selected from the group consisting of the ions of alkali metals and alkaline earth metals and ammonium ion, the ratio of the number of the serpentine layers to the number of the saponite layers x:y being in the range from 0.1 to 10.

2. A method for the preparation of a synthetic mixed-layer silicate comprising x layers in number of serpentine and y layers in number of saponite, in which the serpentine has a chemical composition expressed by the general formula $$Si_{2-a}Al_{2a}Mg_{3-a}O_5(OH)_{4-b}F_b,$$

in which the subscript a is 0 or a positive number not exceeding 1 and the subscript b is 0 or a positive number not exceeding 4, and the saponite has a chemical composition expressed by the general formula $$[Si_{4-c-d}Al_{c+2d}Mg_{3-d}O_{10}(OH)_{2-e}F_e]^{c-}.M^{f+}c/f,$$

in which the subscript c is a positive number smaller than 1, the subscript d is 0 or a positive number not exceeding 1, the subscript e is 0 or a positive number not exceeding 2, the subscript f is a positive number in the range from 1 to 2 and M is a cation or a combination of cations selected from the group consisting of the ions of alkali metals and alkaline earth metals and ammonium ion, the ratio of the number of the serpentine layers to the number of the saponite layers being in the range from 0.1 to 10, which comprises the steps of:

(a) preparing an acidic aqueous solution containing silicic acid, a magnesium salt and an aluminum salt;

(b) alkalifying the acidic aqueous solution by the addition of a water-soluble alkaline compound to precipitate a hydrous composite oxide containing silicon, magnesium and aluminum;

(c) collecting the precipitates of the hydrous composite oxide by separating from the aqueous medium;

(d) admixing the precipitates of the hydrous composite oxide with an aqueous solution of an alkali metal hydroxide to give an aqueous slurry; and (e) subjecting the aqueous slurry of the hydrous composite oxide prepared in step (d) to a hydrothermal treatment by heating at a temperature in the range from 100° C. to 500° C.

3. The method as claimed in claim 2 in which the water-soluble alkaline compound in step (b) is selected from the group consisting of ammonia water, sodium hydroxide, potassium hydroxide and lithium hydroxide.

4. The method as claimed in claim 2 in which the aqueous solution containing the hydrous composite oxide produced in step (b) has a pH in the range from 7 to 12.

5. The method as claimed in claim 4 in which the aqueous solution containing the hydrous composite oxide produced in step (b) has a pH in the range from 9 to 11.

6. The method as claimed in claim 2 in which the aqueous slurry of the hydrous composite oxide prepared in step (d) is further admixed with a water-soluble fluoride or hydrofluoric acid.

7. A method for the preparation of a synthetic mixed-layer silicate comprising x layers in number of serpentine and y layers in number of saponite, in which the serpentine has a chemical composition expressed by the general formula $$Si_{2-a}Al_{2a}Mg_{3-a}O_5(OH)_{4-b}F_b,$$

in which the subscript a is 0 or a positive number not exceeding 1 and the subscript b is 0 or a positive number not exceeding 4, and the saponite has a chemical composition expressed by the general formula $$[Si_{4-c-d}Al_{c+2d}Mg_{3-d}O_{10}(OH)_{2-e}F_e]^{c-}.M^{f+}c/f,$$

in which the subscript c is a positive number smaller than 1, the subscript d is 0 or a positive number not exceeding 1, the subscript e is 0 or a positive number not exceeding 2, the subscript f is a positive number in the range from 1 to 2 and M is a cation or a combination of cations selected from the group consisting of the ions of alkali metals and alkaline earth metals and ammonium ion, the ratio of the number of the serpentine layers to the number of the saponite layers being in the range from 0.1 to 10, which comprises the steps of:

(a) preparing an aqueous alkaline solution containing sodium silicate;

(b) mixing the aqueous alkaline solution prepared in step (a) with an aqueous solution of a magnesium salt and an aqueous solution of an aluminum salt to precipitate a hydrous composite oxide containing silicon, magnesium and aluminum;

(c) collecting the precipitates of the hydrous composite oxide by separating from the aqueous medium;

(d) admixing the precipitates of the hydrous composite oxide with an aqueous solution of an alkali metal hydroxide to give an aqueous slurry; and (e) subjecting the aqueous slurry of the hydrous composite oxide prepared in step (d) to a hydrothermal treatment by heating at a temperature in the range from 100° C. to 500° C.

8. The method as claimed in claim 7 in which the aqueous solution containing the hydrous composite oxide produced in step (b) has a pH in the range from 7 to 12.

9. The method as claimed in claim 8 in which the aqueous solution containing the hydrous composite oxide produced in step (b) has a pH in the range from 9 to 11.

10. The method as claimed in claim 7 in which the aqueous slurry of the hydrous composite oxide prepared in step (d) is further admixed with a water-soluble fluoride or hydrofluoric acid.

11. A method for the preparation of a synthetic mixed-layer silicate comprising x layers in number of serpentine and y layers in number of saponite, in which the serpentine has a chemical composition expressed by the general formula $$Si_{2-a}Al_{2a}Mg_{3-a}O_5(OH)_{4-b}F_b,$$

in which the subscript a is 0 or a positive number not exceeding 1 and the subscript b is 0 or a positive number not exceeding 4, and the saponite has a chemical composition expressed by the general formula $$[Si_{4-c-d}Al_{c+2d}Mg_{3-d}O_{10}(OH)_{2-e}F_e]^{c-}.M^{f+}c/f,$$

in which the subscript c is a positive number smaller than 1, the subscript d is 0 or a positive number not exceeding 1, the subscript e is 0 or a positive number not exceeding 2, the subscript f is a positive number in the range from 1 to 2 and M is a cation or a combination of cations selected from the group consisting of the ions of alkali metals and alkaline earth metals and ammonium ion, the ratio of the number of the serpentine layers to the number of the saponite layers being in the range from 0.1 to 10, which comprises the steps of:

(a) preparing an aqueous alkaline solution containing sodium silicate and sodium aluminate;

(b) mixing the aqueous alkaline solution prepared in step (a) with an aqueous solution of a magnesium salt to precipitate a hydrous composite oxide containing silicon, magnesium and aluminum;

(c) collecting the precipitates of the hydrous composite oxide by separating from the aqueous medium;

(d) admixing the precipitates of the hydrous composite oxide with an aqueous solution of an alkali metal hydroxide to give an aqueous slurry; and (e) subjecting the aqueous slurry of the hydrous composite oxide prepared in step (d) to a hydrothermal treatment by heating at a temperature in the range from 100° C. to 500° C.

12. The method as claimed in claim 11 in which the aqueous solution containing the hydrous composite oxide produced in step (b) has a pH in the range from 7 to 12.

13. The method as claimed in claim 12 in which the aqueous solution containing the hydrous composite oxide produced in step (b) has a pH in the range from 9 to 11.

14. The method as claimed in claim 11 in which the aqueous slurry of the hydrous composite oxide prepared in step (d) is further admixed with a water-soluble fluoride or hydrofluoric acid.

* * * * *

UNITED STATES PATENT AND TRADEMARK OFFICE
CERTIFICATE OF CORRECTION

PATENT NO. : 5,595,716

DATED : January 21, 1997

INVENTOR(S) : Kazuo TORII et al.

It is certified that error appears in the above-indentified patent and that said Letters Patent is hereby corrected as shown below:

Column 2, line 35, change

"$Si_{4-c-d}Al_{c+2d}Mg_{3-d}O_{10}(OH)_2 \cdot (Na)_c,$"

to

-- $Si_{4-c-d}Al_{c+2d}Mg_{3-d}O_{10}(OH)_2 \cdot (Na)_c,$ --.

Column 3, line 13, change

"$[Si_{4-c-d}Al_{c+2d}Mg_{3-d}O_{10}(OH)_{2-c}F_c]^{c-} \cdot M^{f+}c/f,$"

to

-- $[Si_{4-c-d}Al_{c+2d}Mg_{3-d}O_{10}(OH)_{2-c}F_c]^{c-} \cdot M^{f+}{}_{c/f},$ --.

Column 14, claim 1, line 10, change

"$[Si_{4-c-d}Al_{c+2d}Mg_{3-d}O_{10}(OH)_{2-c}F_c]^{c-} \cdot M^{f+}c/f,$"

to

-- $[Si_{4-c-d}Al_{c+2d}Mg_{3-d}O_{10}(OH)_{2-c}F_c]^{c-} \cdot M^{f+}{}_{c/f},$ --.

UNITED STATES PATENT AND TRADEMARK OFFICE
CERTIFICATE OF CORRECTION

PATENT NO. : 5,595,716
DATED : January 21, 1997
INVENTOR(S) : Kazuo TORII et al.

It is certified that error appears in the above-identified patent and that said Letters Patent is hereby corrected as shown below:

Column 14, claim 2, line 10, change

"$[Si_{4-c-d}Al_{c+2d}Mg_{3-d}O_{10}(OH)_{2-e}F_e]^{c-} \cdot M^{f+}c/f,$"

to

-- $[Si_{4-c-d}Al_{c+2d}Mg_{3-d}O_{10}(OH)_{2-e}F_e]^{c-} \cdot M^{f+}_{c/f},$ --.

Column 15, claim 7, line 10, change

"$[Si_{4-c-d}Al_{c+2d}Mg_{3-d}O_{10}(OH)_{2-e}F_e]^{c-} \cdot M^{f+}c/f,$"

to

-- $[Si_{4-c-d}Al_{c+2d}Mg_{3-d}O_{10}(OH)_{2-e}F_e]^{c-} \cdot M^{f+}_{c/f},$ --.

Column 16, claim 11, line 11, change

"$[Si_{4-c-d}Al_{c+2d}Mg_{3-d}O_{10}(OH)_{2-e}F_e]^{c-} \cdot M^{f+}c/f,$"

to

-- $[Si_{4-c-d}Al_{c+2d}Mg_{3-d}O_{10}(OH)_{2-e}F_e]^{c-} \cdot M^{f+}_{c/f},$ --.

UNITED STATES PATENT AND TRADEMARK OFFICE
CERTIFICATE OF CORRECTION

PATENT NO. : 5,595,716
DATED : January 21, 1997
INVENTOR(S) : Kazuo TORII et al.

It is certified that error appears in the above-identified patent and that said Letters Patent is hereby corrected as shown below:

Column 10, Table 4, line 3 from the bottom, change "MLS II" to --MLS III--.

Signed and Sealed this

Third Day of February, 1998

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,595,716
DATED : January 21, 1997
INVENTOR(S) : Kazuo TORII et al.

It is certified that error appears in the above-identified patent and that said Letters Patent is hereby corrected as shown below:

Title page, item [73]
Correct assignee's name from "Japan as directed by Director General of Agency of Industrial Science and Technology" to --Japan as represented by Director General of Agency of Industrial Science and Technology--.

Signed and Sealed this

Third Day of November, 1998

Attest:

BRUCE LEHMAN

Attesting Officer

Commissioner of Patents and Trademarks